May 24, 1932.  G. DEN BESTEN  1,859,649
CUSHION SAFETY HITCH
Filed July 22, 1929  2 Sheets-Sheet 2

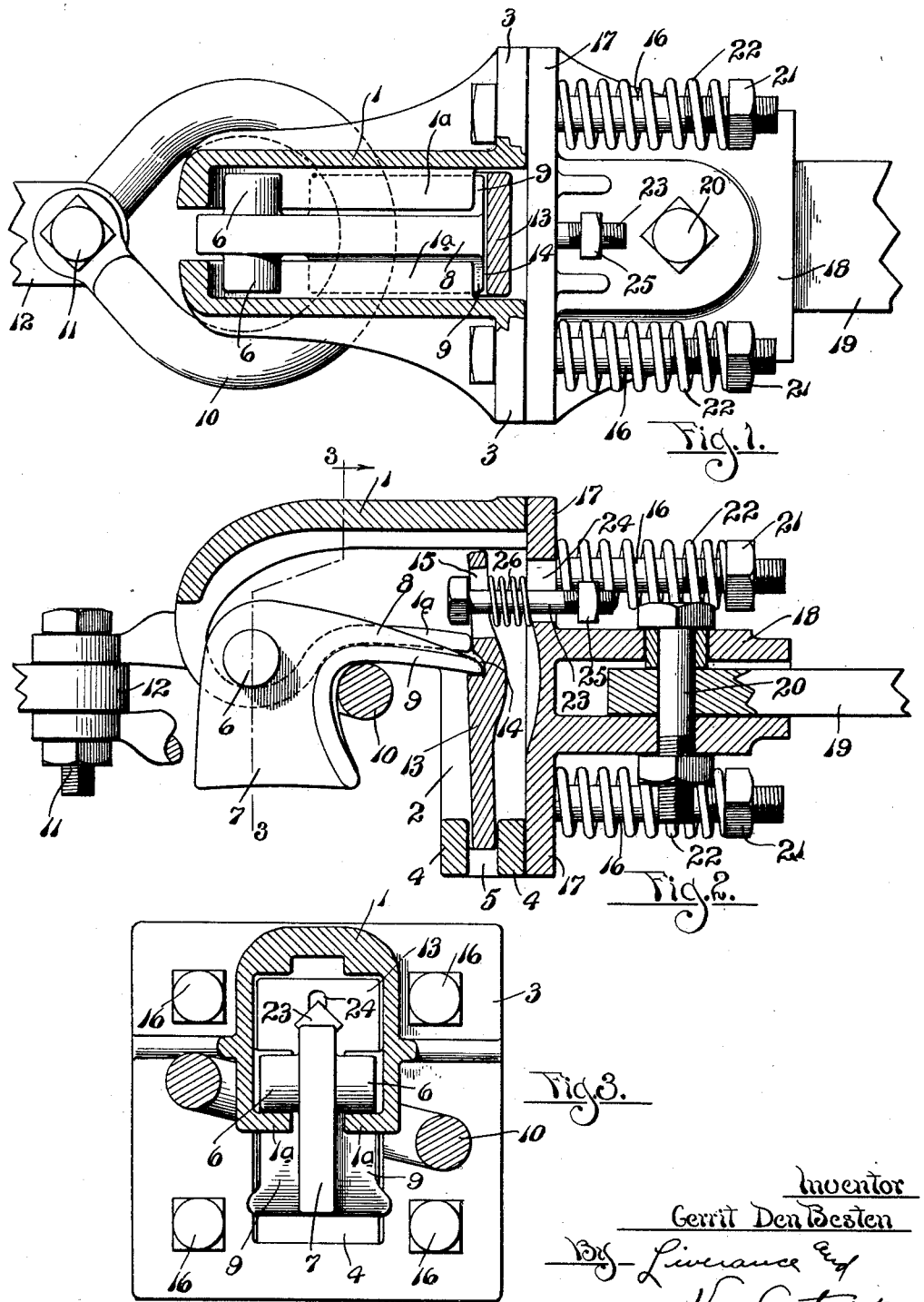

Inventor
Gerrit Den Besten
By Lawrence and Van Antwerp
Attorneys

Patented May 24, 1932

1,859,649

UNITED STATES PATENT OFFICE

GERRIT DEN BESTEN, OF HOLLAND, MICHIGAN

CUSHION SAFETY HITCH

Application filed July 22, 1929. Serial No. 379,970.

This invention relates to a cushion safety hitch which may be interposed between a tractor, motor truck, or any other pulling mechanism and any apparatus or implements which are to be drawn thereby. One place where the device is very useful is in making a connecting hitch between a tractor and plows drawn by the tractor. It is to be understood, however, that the device is not necessarily used with a tractor and plows but is available for use between any pulling or drawing power and devices which are pulled or drawn thereby.

It is a primary object and purpose of the present invention to provide an exceedingly simple and economically constructed hitch which has inherent properties of cushioning the connection between the drawing and the drawn devices and at the same time which will automatically disconnect in case of a pulling force between the same greater than may be safely withstood. A further object of the invention is to provide a novel construction of a hitch wherein, upon the attainment of this extra heavy force, the drawn member or device is automatically unlatched from the hitch yet the reconnection therewith is very simple and easy to secure. A still further object of the invention is to construct a hitch, having the advantages stated, of a very few and very simply manufactured parts which can be assembled without the use of tools, other than a wrench, and which is strong and durable and fully capable of withstanding the severe usage to which it is subjected in service.

An understanding of the invention may be had from the following description taken in connection with the accompanying drawings, in which, Fig. 1 is a plan view of the hitch, one member thereof being shown in horizontal section for a better disclosure of the structure.

Fig. 2 is a central longitudinal vertical section through the construction shown in Fig. 1.

Fig. 3 is a front elevation and vertical section, the plane of the section being taken substantially on the line 3—3 of Fig. 2.

Like reference characters refer to like parts in the different figures of the drawings.

Figure 4:
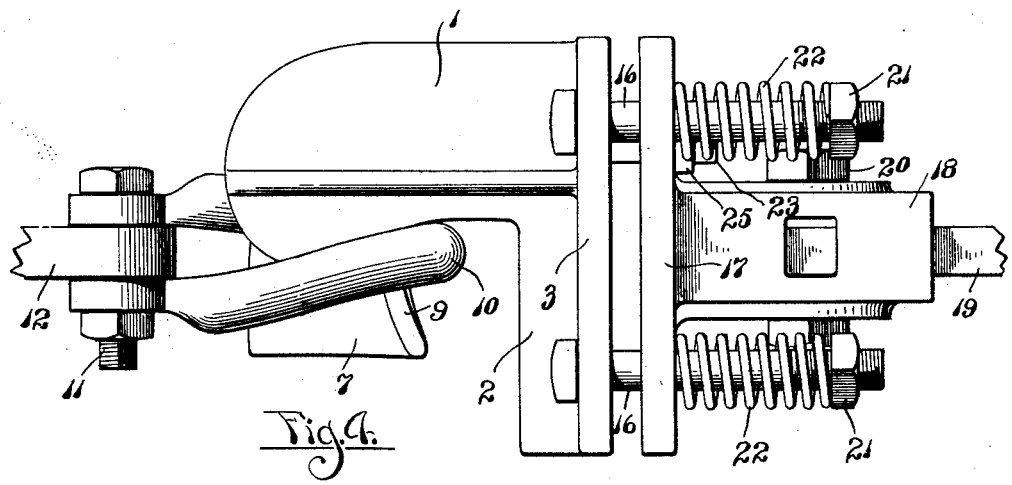
Fig. 4 is a side elevation of the hitch of my invention.

In the construction of the hitch of my invention, one member thereof, indicated at 1, is formed as an integral casting, having spaced apart sides integrally connecting at their upper edges but separated by a slot at their lower portions, the metal being turned inwardly to provide flanges 1a at each side of the slot. The part 1 described, at one end has integral downwardly extending sides 2 from which flanges 3 extend outwardly being connected by spaced apart horizontal cross bars 4 at their lower ends; while between the cross bars are horizontal lugs 5 which serve as supports for the lower end of the latching bar which will later be described.

Associated with the hitch member described is a hook substantially in the form of a bell-crank lever and mounted on oppositely extending trunnions 6 integral with the two arms 7 and 8 of the hook, which arms are located substantially at right angles to each other and at one edge are formed with outwardly extending flanges 9 as shown. This hook construction is disposed between the sides 1 and 2 of the hitch member described, the trunnions 6 lying above the flanges 1a so as to have bearing thereon. In the assembly of the hook with the hitch member the trunnions are inserted at and above the free ends of the flanges 1a and the hook moved lengthwise of said member so that the trunnions 6 are brought adjacent to the outer end of said member 1 with the flanges 9 of the hook located below the flanges 1a.

The hook in use may be turned about the axis of the trunnions 6 and may be located in the position shown in Fig. 2 wherein the arm 7 extends downwardly and the arm 8 substantially horizontal, permitting a clevis such as 10, to be located around the depending arm 7 of the hook, as shown. The ends of the clevis are formed into eyes located one over the other through which a bolt 11 passes, at the same time passing through the end of a bar 12 which is disposed between the eyes of the clevis and which may be connected in any suitable manner to the device which is being drawn such as a plow or plows or other implements.

The hook with which the clevis is engaged is held in operative position by a latch bar 13 vertically disposed between the depending sides 2 of the member 1 and having its lower end received between the bars 4, resting upon the lugs 5. The side of the latch bar 13 adjacent the end of the arm 8 of the hook is formed with a notch 14, into which the end of said arm 8 may be inserted so as to bear against the lower side of the notch to hold the hook in operative position, as appears in Fig. 5, the hook will be free to rotate in a clockwise direction and will rotate by reason of the pull of the clevis 10 thereon, the line of force which is below the axis of the trunnions 6, turning the hook to the dotted line position shown in Fig. 5 and thereby automatically disengaging the clevis therefrom.

The upper end of the latch bar 13 is provided with a vertical slot 15 the purpose of which will be hereinafter set forth.

A plurality of bolts 16, four being shown in the structure illustrated, extend through the flanges 3 of the hitch member 1, one at each corner thereof. The heads of the bolts are at one side of the flanges. The bolts also extend through a similar vertical flange 17 on a second member of the hitch which consists of said vertical flange 17 and an integral horizontal projection 18 cast therewith which has a lengthwise opening for the reception of a bar 19 which may be connected in any suitable manner to the pulling device, such as a truck, tractor, team of horses or the like; and the bar 19 and the projection 18 are detachably connected together by a vertical bolt 20 passing through them. The bolts 16 are provided with nuts 21 adjacent their ends between which nuts and the outer side of the flange 17, heavy coiled compression springs 22 are located around the bolts, the effect of which normally is to draw the flanges 3 and 17 into close engagement with each other as shown in Fig. 2.

A bolt 23 extends through the slot 15 of the latch bar 13 and also through a vertical slot 24 made in the flange 17 above the projection 18. The head of the bolt comes against one side of the latch bar 13 and a nut 25 on the bolt 23, is located normally a distance away from the outer side of the flange 17. A relatively light coiled compression spring 26 is disposed around the bolt 23 between the latch bar 13 and the inner side of the flange 17, the tendency of which is to turn the latch bar in a counter clockwise direction to maintain the end of the arm 8 of the hook in the notch 14.

It is evident that with this construction the tension of the springs 22 may be regulated by nuts 21 and that the nut 25 may be adjusted to different positions on the bolt 23. When the hitch is in use the springs 22 compress in accordance with the pulling force which is exerted and transmitted between the bars 19 and 12. So long as this force is not sufficient to compress the springs to bring the nut 25 in engagement with the flange 17 the hitch remains in operative position. But upon the development of a force great enough to compress the springs to a point that the nut 25 is engaged by flange 17 so as to pull the bolt 23 to the right (Figs. 2 and 5), there then occurs a movement of the latch bar 13 to the right which causes the disconnection of the latch bar from the arm 8 of the hook with an immediate automatic disconnection of the clevis 10. But during the time that the clevis is engaged with the hook the force between two parts of the hitch is cushioned and softened by the springs 22 as is evident.

Figure 5:
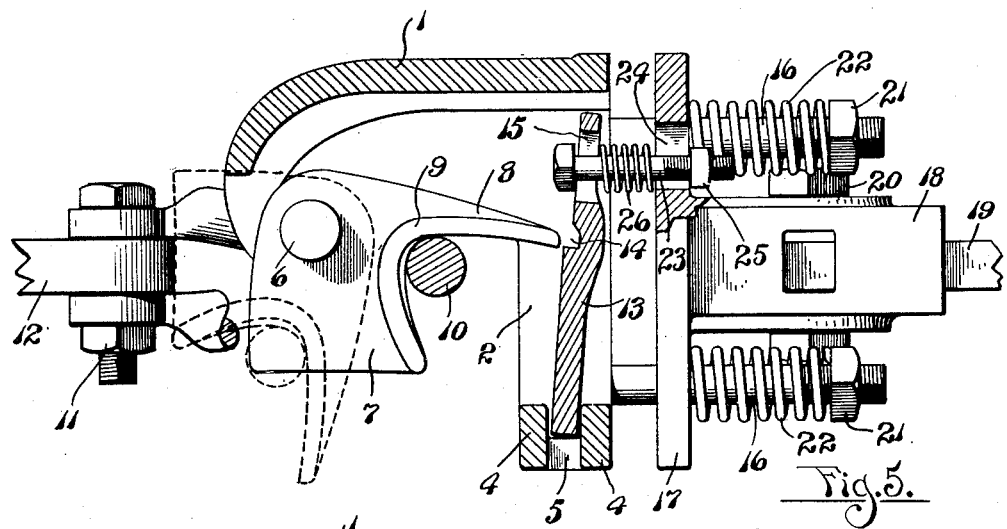
Fig. 5 is a section, similar to that shown in Fig. 2, illustrating the manner in which the disconnection of the drawing and the drawn device takes place.
Figure 6:
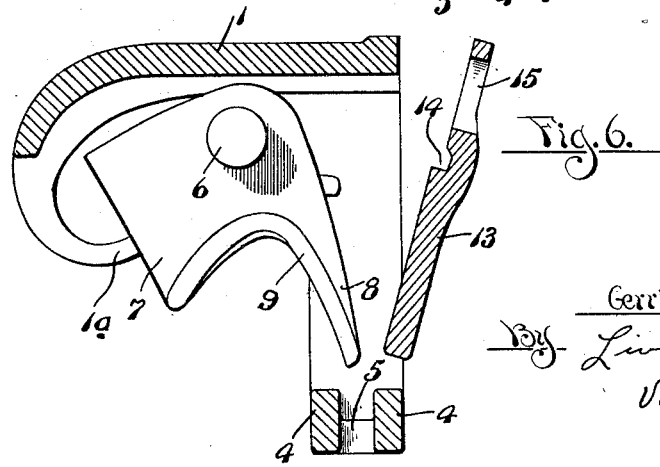
Fig. 6 is a central vertical section through one of the members of the hitch, illustrating the latch member separated therefrom and showing the manner in which it may be assembled therewith.

For reengagement of the clevis with the hook and the hook with the latch bar 13, it is merely necessary to bring the clevis into operative position at the bend of the hook and turn the hook in a counter clockwise direction from the dotted line position shown in Fig. 5 to the normal full line position shown in Figs. 2 and 5, whereupon the end of the arm 8 rides against a side of the latch bar 13 and compresses the spring 26 until the notch 14 is reached. There is then an immediate receiving of the end of said arm 8 of the hook in the notch 14.

As previously stated the hitch construction is simple from a mechanical and manufacturing standpoint. The hook with which the clevis is engaged and the latch are small castings, very easy to manufacture and requiring no machining. The two hitch members require no machining beyond drilling the holes necessary to pass the bolts 16 and 20. The bolts that are used and the coiled springs are stock articles which may be bought in quantities at low cost. The assembly is very quick and easy and the only tool required is a wrench for adjusting the various nuts 21 and 25. The adjustments of the nuts 21 and 25 readily control the hitch as to the degree of force which is necessary to effect the automatic disconnection of the drawing and drawn devices so that a greater or less degree of pulling force may be predetermined, at which the disconnection is to take place.

The invention is defined in the appended claims and is to be considered comprehensive of all forms of structure coming within their scope.

I claim:

1. A hitch comprising, two hitch members located in longitudinal alinement and one against the other, yielding means connecting the hitch members, said means yielding to permit separation thereof, the extent of separation being proportionate to the pulling force exerted on said hitch members, a single hook mounted on one of said hitch members with which a connecting member to a drawn device is adapted to engage, a latch mounted on the same hitch member adapted to releasably hold said hook in operative position, and means interposed between the latch and the other of the hitch members for moving the latch to disconnect from said hook on separation of the hitch members a predetermined distance.

2. A construction of the class described comprising, two movable hitch members disposed in longitudinal alinement, each having vertical contacting flanges at their adjacent ends, yielding means for connecting the flanges of said hitch members together normally holding the same with their flanges in contact but permitting separation upon the exertion of pulling forces on said hitch members in the direction of their length, a hook rotatively mounted on one of the said hitch members having two arms located substantially at right angles to each other, one in the operative position of the hook extending downwardly and the other horizontally, a movably mounted latch bar on the same hitch member having a notch in which the end of the horizontal arm is adapted to seat, and a bolt passing through one end of the latch bar and through the flange of the adjacent hitch member, said bolt having a head at one end and a nut at the other whereby a separation of the hitch members a predetermined distance causes the latch bar to be drawn away and disconnected from the end of the horizontal arm of said hook.

3. A hitch comprising, two hitch members located in horizontal alinement with adjacent ends normally in contact engagement with each other, yielding means for holding the hitch members together, said means yielding upon exertion of pulling forces on the hitch members to permit their separation, a movable latch mounted on one of the hitch members, means extending from said latch to the other of the hitch members whereby the latch is operated upon separation of the hitch members a predetermined distance, and a hook rotatively mounted on the same hitch member on which the latch bar is mounted, said hook comprising two arms located substantially at right angles to each other, one extending vertically and the other horizontally from the pivot of said hook when the hook is in operative position, the end of the horizontal arm of said hook being normally engaged by the latch to hold the hook in operative position.

4. A hitch comprising two hitch members located in horizontal alinement with adjacent ends normally in contact engagement, yielding spring means for holding the hitch members together but permitting their separation upon the exertion of force to overcome the spring means, means for adjusting the tension of said spring means, a pivotally mounted latch bar mounted on one of said hitch members, means extending through said latch bar and the other of said hitch members for moving the latch bar in one direction on separation of the hitch members a predetermined distance, and a movably mounted hook member carried by and mounted on the same hitch member that carries the latch bar adapted to be held in operative position by said latch bar and being freed from engagement with said latch bar on the movement thereof caused by a separation of the hitch members.

5. A hitch comprising two hitch members, one having a vertical flange and a projection extending horizontally therefrom to which a drawing or drawn implement is adapted to be secured, the other hitch member having vertical laterally extending flanges at one end of a horizontal hollow projection having spaced apart sides and a slot in its lower side, bolts passing through the flanges of the hitch members, nuts on the ends of the bolts, coiled compression springs around the bolts between said nuts and the flange of the adjacent hitch member, a vertical latch bar mounted between the sides of the second hitch member for pivotal movement about its lower end, a bolt passing through the upper end of the latch bar and through the flange of the first hitch member, said bolt having a head at one end and a nut at the other, and a hook member mounted between the side of the second hitch member and extending through said slot therein, said hook member comprising two arms disposed substantially at right angles to each other and horizontal trunnions projecting laterally at the angle of said arms, said trunnions being mounted on the second hitch member with the horizontal arm extending toward the latch bar, and said latch bar having a notch in its side to receive the end of the horizontal arm of said hook member.

6. A construction containing the elements in combination defined in claim 5 combined with a relatively light coiled compression spring located around the bolt extending through the latch bar and between said latch bar and the flange of said first hitch member.

7. A hitch comprising two hitch members located in horizontal alinement with adjacent ends normally in contact engagement, yielding spring means for holding the hitch members together, a hook pivotally mounted on one hitch member, a latch pivoted on the same hitch member and having a notch along its length engaged by the hook, movable means adapted to engage the free end of the latch to release the hook, and means actuated by the separation of the hitch members to actuate the movable means.

In testimony whereof I affix my signature.

GERRIT DEN BESTEN.